(12) United States Patent
Huang et al.

(10) Patent No.: US 11,734,815 B2
(45) Date of Patent: Aug. 22, 2023

(54) METHOD FOR MEASURING FULL-FIELD STRAIN OF AN ULTRA-HIGH TEMPERATURE OBJECT BASED ON DIGITAL IMAGE CORRELATION METHOD

(71) Applicant: University of Science and Technology of China, Hefei (CN)

(72) Inventors: Shenghong Huang, Hefei (CN); Zhiwei Pan, Hefei (CN); Menglai Jiang, Hefei (CN); Zhifeng Zheng, Hefei (CN); Meixia Qiao, Hefei (CN)

(73) Assignee: University of Science and Technology of China, Hefei (CN)

( * ) Notice: Subject to any disclaimer, the term of this patent is extended or adjusted under 35 U.S.C. 154(b) by 258 days.

(21) Appl. No.: 17/388,131

(22) Filed: Jul. 29, 2021

(65) Prior Publication Data

US 2022/0284558 A1 Sep. 8, 2022

(30) Foreign Application Priority Data

Oct. 10, 2020 (CN) .......................... 202011075812.4

(51) Int. Cl.
| | |
|---|---|
| *G06T 7/00* | (2017.01) |
| *H04N 13/25* | (2018.01) |
| *G01L 1/24* | (2006.01) |
| *H04N 5/72* | (2006.01) |
| *H04N 17/00* | (2006.01) |

(52) U.S. Cl.
CPC .............. *G06T 7/001* (2013.01); *G01L 1/248* (2013.01); *H04N 5/72* (2013.01); *H04N 13/25* (2018.05); *H04N 17/002* (2013.01); *G06T 2207/10012* (2013.01); *G06T 2207/10048* (2013.01); *G06T 2207/30136* (2013.01)

(58) Field of Classification Search
CPC .. G06T 1/20; G06T 1/60; G06T 7/001; G01L 1/248; H04N 17/002; H04N 5/72; H04N 13/25; G06Q 10/0833; G06Q 10/087; G07G 1/0054

See application file for complete search history.

(56) References Cited

U.S. PATENT DOCUMENTS

| | | | |
|---|---|---|---|
| 2006/0086912 A1* | 4/2006 | Weir ...................... | G01N 25/72 250/559.4 |
| 2020/0167885 A1* | 5/2020 | Kimura ................... | G06T 7/001 |

* cited by examiner

*Primary Examiner* — Phuoc H Doan

(74) *Attorney, Agent, or Firm* — Forsgren Fisher McCalmont DeMarea Tysver LLP; James M. Urzedowski; Daniel A. Tysver

(57) ABSTRACT

The present disclosure relates to a method for measuring full-field strain of an ultra-high temperature (UHT) object based on a digital image correlation method. The temperature range is from normal temperature to 3500 degrees Celsius. The method includes the steps of selecting a proper high-temperature-resistant speckle material, tantalum carbide powder, according to the characteristics of the object to be measured. First, polishing a to-be-measured surface of a tungsten test piece to remove an oxide layer, then mixing the tantalum carbide (TaC) powder and absolute ethanol to form a paste according to a mass ratio of 1:2. Making randomly distributed speckles from the mixture on the to-be-measured surface of the test piece which has been processed. In order to improve firmness and stability of the newly made speckles, performing curing treatment to the speckles.

11 Claims, 3 Drawing Sheets

METHOD FOR MEASURING FULL-FIELD STRAIN OF AN ULTRA-HIGH TEMPERATURE OBJECT BASED ON DIGITAL IMAGE CORRELATION METHOD

CROSS REFERENCE TO RELATED APPLICATION

This patent application claims the benefit and priority of Chinese Patent Application No. 202011075812.4, filed on Oct. 10, 2020, the entire content of which is incorporated herein by reference.

BACKGROUND OF THE INVENTION

The present disclosure relates to high temperature experimental mechanics field and digital image recognition field, and more particularly, to a method for measuring full-field strain of an ultra-high temperature (UHT) object based on a digital image correlation method, which is applied in UHT displacement and strain measurement of various fields of nuclear engineering, aerospace, and high temperature materials, and the like.

With the rapid development of nuclear engineering and aerospace, the demand for high temperature materials is also increasing. Therefore, it is of vital importance to study the mechanical properties of these materials in a high temperature environment for the selection and structural design of proper high-temperature materials. Currently, there are mainly two types of strain measurement of materials in UHT environment: contact way and non-contact way.

The contact way mainly realizes high-temperature strain measurement by strain gauges and extensometers; however, this method can merely acquire displacement strain data of some discrete points and cannot perform a full-field strain measurement on the surface of the test piece. Secondly, when a high-temperature strain gauge is connected to the surface of the test piece, it will locally strengthen the materials, which affects the accuracy of measurement. Finally, the temperature of the currently used high-temperature strain is usually very low, and it cannot perform the strain field measurement under UHT (>1500 degrees Celsius). Since the optical measurement method is a non-contact measurement method, it can acquire the strain data of the test piece without contacting the test piece, and thus it has been widely used. Currently, the most widely used optical measurement method is digital image correlation (DIC) method, which is a kind of full-field non-contact optical measurement method, requires low for devices and has high measurement accuracy.

Currently, there are mainly two problems that restrict the use of the DIC method: (1) stability of the speckle materials under the UHT; (2) interference on strain measurement by the self-illumination of the object under the UHT. At the current stage, the temperature used for commercial speckle materials rarely exceeds 1500 degrees Celsius, and the existing problems are that the speckle materials may be ablated and fallen in the high temperature, so the calculation for the strain field may be wrong or even cannot be performed. Currently, most DIC methods use blue light illumination; due to the interference of the self-illumination of high-temperature objects, the temperature range of measurement is very limited, substantially not exceeding 1500 degrees Celsius. However, there are no reports about such speckle materials that can be stable under higher temperature, or a filtering method used in UHT. Few DIC methods use violet illumination which has shorter wavelength, to realize strain measurement under higher temperature, which may be up to 1800 degrees Celsius. In many industrial fields, the temperature for the materials is very high; for example, in the field of nuclear fusion, the plasma facing component usually needs to bear an extreme high temperature environment, which may even melt a pure tungsten material. Measurement of mechanical behavior of tungsten materials under such high temperature environment is extremely difficult.

BRIEF SUMMARY OF THE INVENTION

In order to overcome the problem that the prior art cannot make strain measurement in UHT (>2000 degrees Celsius), the present disclosure provides a method for measuring full-field strain of an ultra-high temperature (UHT) object based on a digital image correlation method, which mixes micron tantalum carbide powder with absolute ethanol to form a paste, prepares speckle patterns distributed randomly on tungsten materials, and reduces the interference on strain measurement due to strong self-illumination of high temperature test by combining with two commercial blue light filters, and performs strain filed measurement in a range of 2000~3500 degrees Celsius. The solution is characterized by simple processing, low cost, extreme high temperature, and high accuracy, and it is a breakthrough for the previous technical challenge.

The technical solution used by the present disclosure to solve the technical problem thereof is:

(1) polishing a to-be-measured surface level by level (first 800 mesh sandpaper, and then 1500 mesh paper) to remove an oxide layer, and cleaning with alcohol to remove stains;

(2) mixing selected speckle materials (micron tantalum carbide powder TaC), with absolute ethanol according to a mass ratio of 1:2 to form a paste;

(3) dipping the paste mixture in step (2) by using a needle tip to make randomly distributed speckle patterns on the surface of the test piece treated in step (1); or spraying the paste of tantalum carbide mixture on the surface of the test piece by using a spray gun to make randomly distributed speckle patterns;

(4) drying the speckles made in step (3) in room temperature for 6-8 h, to volatilize the absolute ethanol;

(5) curing the test piece and the speckles dried in step (4) in high temperature; the curing process has two steps; first step: keeping them in a vacuum environment for 5 minutes at a temperature of 400 degrees Celsius, then cooling down to room temperature; second step: keeping them in a vacuum environment for 5 minutes at a temperature of 800 degrees Celsius, then cooling down to room temperature;

(6) installing a sample of the test piece cured in step (5) to a high temperature test platform;

(7) adjusting the camera to make the test piece be imaged clearly in the camera, calibrating a digital image measuring system by a calibration board, connecting an infrared thermometer with a digital image correlation measurement system by a synchronous trigger software, to ensure that collected temperature data correspond to calculated strain field data one by one;

(8) heating the tungsten material test piece in step (6) by using an electronic beam scanning heating system to a UHT (2000~3500 degrees Celsius);

(9) measuring a temperature of a predetermined region of the to-be-measured surface of the test piece by the infrared thermometer;

(10) consecutively shooting and recording side surface of the tungsten block in step (9) by using two CCD cameras;

consecutively shooting and recording the surfaces with the speckle patterns of the test piece in step (9) by using two CCD cameras; at a first temperature range of 25-1200 degrees Celsius, realize strain measurement by using blue light illumination and a single blue light filter; at a second temperature range of 1200-1800 degrees Celsius, turning off the blue light illumination at the first temperature region, using the high temperature self-illumination of the object to be measured to perform CCD camera illumination to realize strain measurement; at a third temperature range of 1800-3500 degrees Celsius, in order to reduce the interference on the strain measurement by the strong self-illumination of the high-temperature object, superimposing two blue filters to realize the strain measurement;

(11) calculating the strain field data of the specific temperature measuring region in step (9) based on the digital image correlation method.

Further, the surface of the to-be-measured object processed in step (1) may be various metal surfaces or may be a surface of ceramic material; the polishing and cleaning processes remove the oxide film and stains on the surface of the test piece.

Further, the speckle materials in step (2) should have a high melting point (>3500 degrees Celsius) and UHT stability and can keep chemical stability with the materials to be measured in the high temperature condition. Besides the tantalum carbide powder used in the present disclosure, powders of other high temperature materials can also be used to make speckles.

Further, as in step (5), the vacuum degree during the curing should be lower than $10^{-2}$ Pa magnitude, preventing the speckle materials and the to-be-measured test piece from being oxidized or reacting with other gases.

Further, as in step (6), the high temperature experimental platform mainly includes a vacuum chamber, an electronic beam scanning heating system, and an optical observing window.

Further, as in step (7), the infrared thermometer and the digital image measurement system are connected through a synchronous trigger.

Further, as in step (10), the strain calculation method is a method based on digital image correlation (DIC).

Further, as in step (11), in order to improve the temperature range of test measurement, the present solution proposes two filtering methods for weakening the self-illumination of the high temperature objects: (1) turning off the additional blue light sources used within the low temperature range in a high temperature (1200-1800 degrees Celsius), and imaging under the high-temperature self-illumination of the test piece instead; (2) still using the high-temperature self-illumination of the test piece in a higher temperature range (1800-3500 degrees Celsius), and combining two filters of blue light wavebands to reduce interference on camera imaging by the high-temperature self-illumination of the test piece, so as to realize the strain field measurement under UHT.

Further, the high temperature speckles made in step (3) should have a feature of random distribution and proper sizes, corresponding to the size of the surface to be measured; the proper size refers to that the size should be 5-10 times the camera resolution and the CCD camera resolution used in the present disclosure in 50 μm/pixel.

Further, in step (10), a CCD camera is used to realize two-dimensional strain filed measurement, and meanwhile two CCD cameras are used to realize three-dimensional strain filed measurement.

Further, in step (10), the two blue light filters are: Bi 440, 420-455 nm; Bi 420, 405-435 mm, respectively, and a narrow-band filtering effect can be acquired by superimposing; the interference on camera imaging by the self-illumination of high temperature object is reduced by filtering twice; or the narrow-band filter effect can be acquired by superimposing filters of other wavebands.

A number of the superimposed filters is greater than or equal to two filters.

Further, in step (11), the strain filed calculation method uses an image before heating as a reference image and matches the speckle patterns of the heated test piece by using the digital image correlation method, so as to calculate the two-dimensional or three-dimensional strain filed.

Further, the speckle material is micron tantalum carbide powder, with an average granularity of 1 micron, and a purity degree of 99.9%; the speckle material may either be micron chromium carbide powder or micron hafnium carbide powder.

Further, the method for measuring full-field strain of an ultra-high temperature (UHT) object based on a digital image correlation method of the present disclosure has the following utilizations: performing non-contact and highly accurate measurement of the full-field deformation caused by thermal load and mechanical load when applying fusion reactor materials and structures into UHT ceramic composite materials and the UHT alloys in extreme environments.

Compared with the prior art, the present disclosure has the following advantages and effects:

(1) The cost for making speckles is low, and it can be applied in a large scale.

(2) The method for making speckles is simple: mixing the tantalum carbide powder with absolute ethanol according to a proper ratio (a mass quality of 1:2) into a paste and spraying the paste tantalum carbide to the to-be-measured surface by a high-pressure spray gun to make randomly distributed speckles.

(3) The speckle materials have very good high temperature resistance, and after going through the UHT (room temperature to 3500 degrees Celsius), the speckle materials still keep excellent stability and robustness, and the morphology and the structure of the speckles do not change obviously.

(4) It uses the manner of self-luminous lighting and superimposing two filters to filter light, which greatly reduces the interference by self-illumination of high temperature objects, such that clear speckle patterns can be obtained by using the CCD camera even in UHT condition for strain field calculation, and this solves the difficulty of interfering the strain measurement by the strong self-illumination and gets excellent effect.

(5) Experiments show that the technical solution proposed by the present disclosure can correctly measure the full-field strain data in a temperature range from room temperature to 3067 degrees Celsius, with an error lower than 7%.

DETAILED DESCRIPTION OF THE INVENTION

The following will describe clearly and completely the technical solutions in the embodiments of the present disclosure by combining the accompanying drawings of the present disclosure. Obviously, the described embodiments are merely a part of the embodiments, not all of the embodiments, of the present disclosure. Based on the embodiments in the present disclosure, all the other embodiments acquired by those of ordinary skill in the art without paying any creative efforts belong to the protection scope of the present disclosure.

Figure 1:
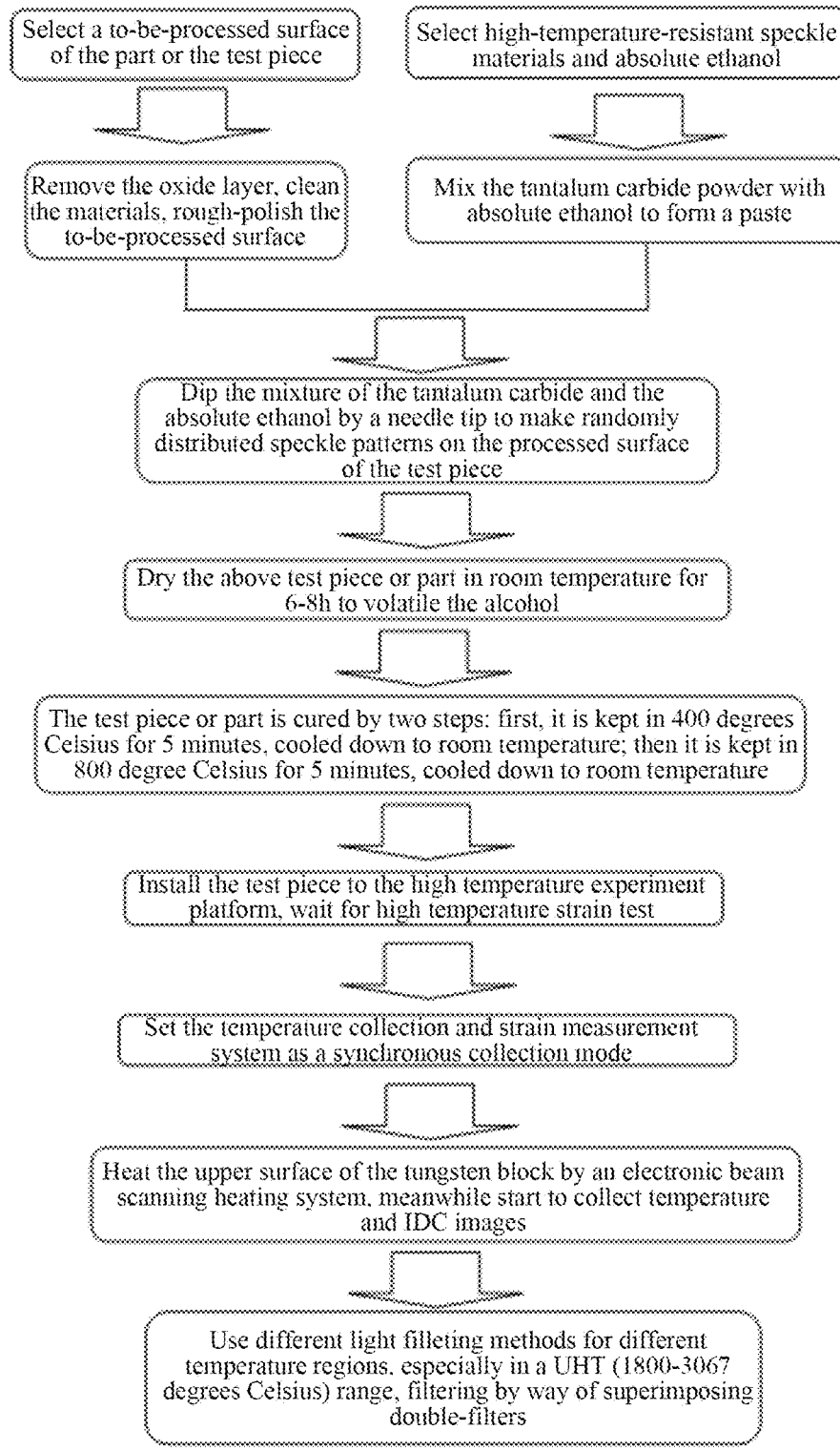
FIG. 1 is an operational flow chart of the present disclosure.

The present disclosure related to a method for measuring full-field strain of an ultra-high temperature (UHT) object based on a digital image correlation method, suitable for the full-field strain measurement of UHT service materials, and it is mainly used for the full-field strain measurement of the plasma facing component in the nuclear fusion engineering, e.g., the full-field strain measurement of tungsten materials in the divertor. As shown in FIG. 1, the method comprises: according to the actual part or test piece, selecting a part or a test piece (e.g., tungsten materials) to be processed, and preparing micron tantalum carbide powder (with an average granularity of 1 micron, and purity degree of 99.9%) and absolute ethanol. The to-be-processed surface is polished step by step and is cleaned with alcohol to remove the oxide films and stains on the surface of the test piece; mixing the tantalum carbide powder with the absolute ethanol according to a mass ratio of 1:2 to form a paste; dipping a little amount of paste by a needle point to make randomly distributed speckle patterns on the surface of the processed test piece. The newly made speckles should first be dried in room temperature for 6-8 h, and then curing process is performed on the speckles in the vacuum environment; first they are kept in 400 degrees Celsius for 5 minutes, cooled down to room temperature; and then they are 800 degrees Celsius for 5 minutes, cooled down to room temperature. In order to prevent the speckles materials and test piece materials from being oxidized, the vacuum degree during the curing should be lower than $10^{-2}$ Pa magnitude. Take out the test pieces, and then the high-temperature-resistance tantalum carbide speckles can be obtained. In order to increase the suitable temperature for measuring full-field strain of the UHT object by using the method, CCD camera illumination is made by using the self-illumination of the measured object in a high temperature region (1200-1800 degrees Celsius). In a UHT region (1800-3500 degree Celsius), in the condition of using self-luminous light, two commercial blue light filters are combined to reduce the interference on the strain measurement of the strong self-illumination of high temperature objects by way of filtering twice. In this way, the strain measurement of tungsten materials from room temperature to 3500 degree Celsius can be implemented by the high-temperature speckle making process and the filtering technology of the self-luminous double-filter of the high temperature objects proposed by the present disclosure. The present disclosure has features of being simple and convenient, low cost, big temperature measurement range, high accuracy, and wide applicability, etc.

The following will describe the present disclosure in great details by combining the accompanying drawings and the detailed embodiments. However, the following embodiments are merely restricted to illustrate the present disclosure, and the protection scope of the present disclosure shall include all the contents of the claims and is not limited to the embodiment.

Embodiment 1

(1) Selecting a 50×20×20 mm pure tungsten block test piece, wherein a 50×20 mm surface is a surface to be processed and preparing a certain amount of tantalum carbide powder (with an average granularity of 1 micron and a purity of 99.9%) and a certain amount of absolute ethanol.

(2) Polishing the surface of the tungsten block, using a sandpaper of 800 mesh and a sandpaper of 1500 mesh for polishing respectively, and then using alcohol and clear water to clean and clear the processing surface, and drying it.

(3) Taking 3 grams of tantalum carbide powder and 6 grams of absolute ethanol, and mixing them sufficiently on a tray, to form a paste.

(4) Dipping the speckle material mixed in step (3) by a needle tip of a needle tube for injection, manually depositing it on the processed surface, repeating the above process, to make the high-temperature-resistant speckle patterns that are randomly distributed. As for a test piece of big size, a high pressure spray gun can be used to spray the paste tantalum carbide mixture onto the surface of the test piece to make randomly distributed speckles.

(5) Drying the speckles made in the above step in room temperature for 6-8 h, to volatilize the absolute ethanol. Here, the speckles are substantially agglomerates of tantalum carbide powder, and contain merely a few amount of non-volatilized absolute ethanol.

(6) The speckle materials made in the above steps are very fragile. In order to increase robustness of the speckles, first a curing process is performed on them. The curing process mainly contains two steps: (I) keeping warm for 5 minutes in an environment of 400 degrees Celsius, and then reducing to room temperature; (II) keeping warm for 5 minutes in an environment of 800 degrees Celsius, and then reducing to room temperature; the curing process needs to be performed in highly vacuum environment, so as to prevent the speckle materials and tungsten block from being oxidized during the curing process, thus influencing the stability of the speckle materials and surface characteristics of the tungsten block; in this embodiment, the curing vacuum degree is $4.7 \times 10^{-2}$ Pa.

(7) Installing the tungsten test piece sample cured in the above step on a high temperature experiment platform. The surface where there are speckles face the camera upright.

(8) Connecting the infrared thermometer with the digital image correlation measurement system by a synchronous triggering software, to ensure that the collected temperature data correspond to the calculated strain filed data one by one.

(9) Heating the tungsten material test piece in step (7) by an electronic beam heating system to a UHT (larger than 3000 degrees Celsius), and the heating region is the upper surface of the test piece.

(10) Using the infrared thermometer to measure the temperature data at the specific region of the side surface of the test piece.

(11) Using a CCD camera to consecutively shoot and record the side surface of the tungsten block in step (10), and calculating the strain filed data in the specific temperature measuring region in step (10) based on the digital image correlation method.

(12) In order to increase the proper temperature for measuring the full-filed strain of the UHT object by using this method to the greatest extent, a blue light source is additional added for illumination from the room temperature to 1200 degrees Celsius; in a higher temperature region (1200-1800 degrees Celsius), CCD camera illumination is performed by the self-illumination of the measured object. At the high temperature region (1800-3067 degrees Celsius), two commercial blue light filters are combined again, then interference on the strain measurement by the strong self-illumination of the high temperature object can be reduced by way of filtering twice.

Figure 2:
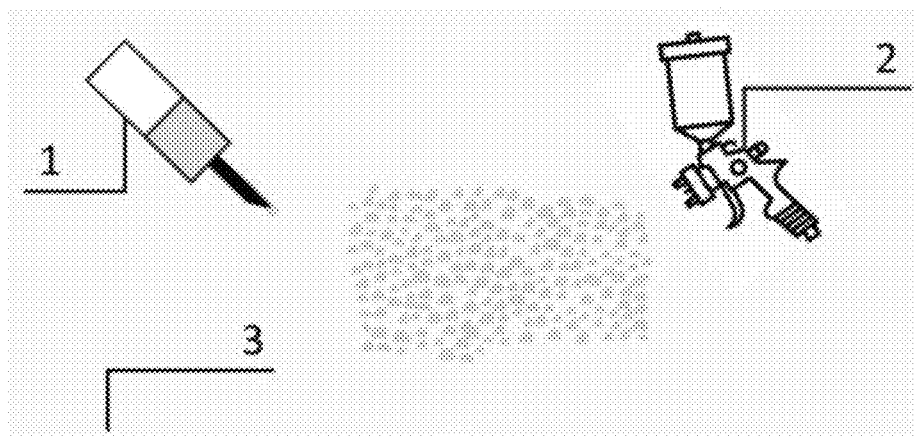
FIG. 2 is a principle schematic diagram of making speckles of the present disclosure.

As shown in FIG. 2, it is a principle schematic diagram of making speckles of the present disclosure; 1—principles of needle tip deposition to make speckles; 2—principles of spraying by a high pressure spray gun to make speckles; 3—speckle-making surface of the test piece.

Figure 3:
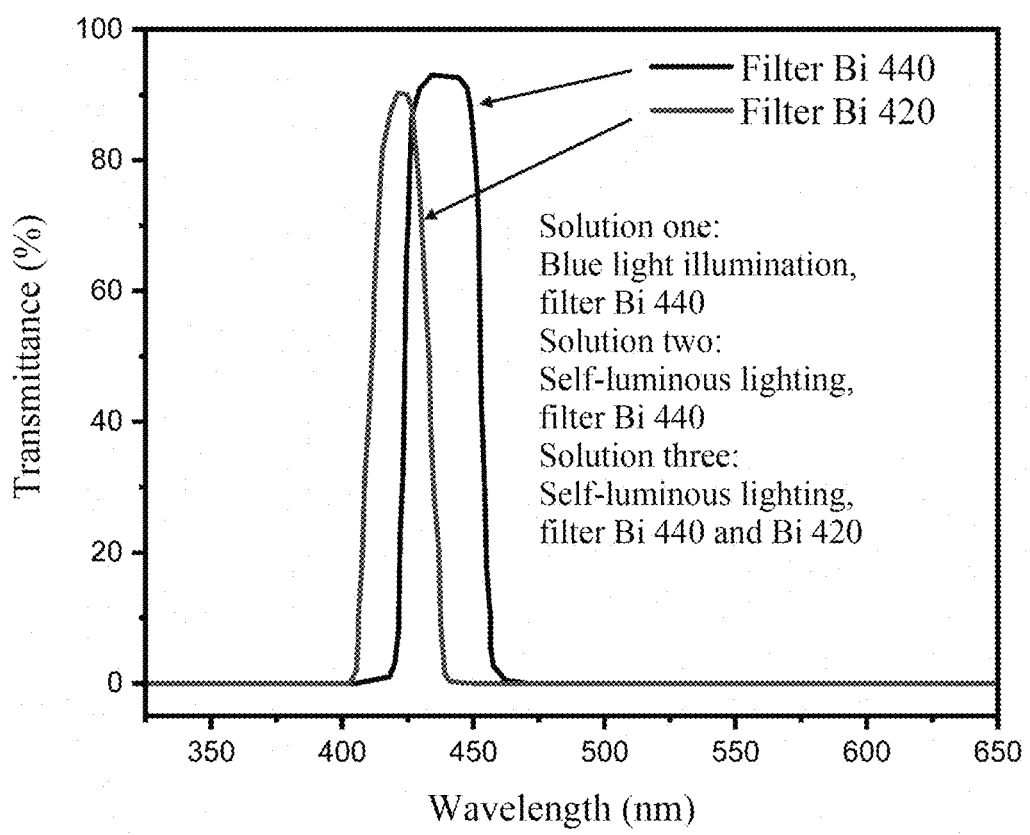
FIG. 3 is a schematic diagram of superimposing transmittance of two blue light filters.

As shown in FIG. 3, it is a simple schematic view of superimposing filtering technology of two filters proposed in the present invention. By superimposing two blue filters (Bi 440, 420-455 nm; Bi 420, 405-435 nm), a narrow-band filtering effect can be obtained. By filtering twice, it can greatly reduce the interference on camera imaging by the self-illumination of the high-temperature object. Such filtering method can make the object with a temperature exceeding 3000 degrees Celsius image clearly in the camera, and the temperature of the object during imaging is obviously increased by using the current filtering method.

Figure 4:
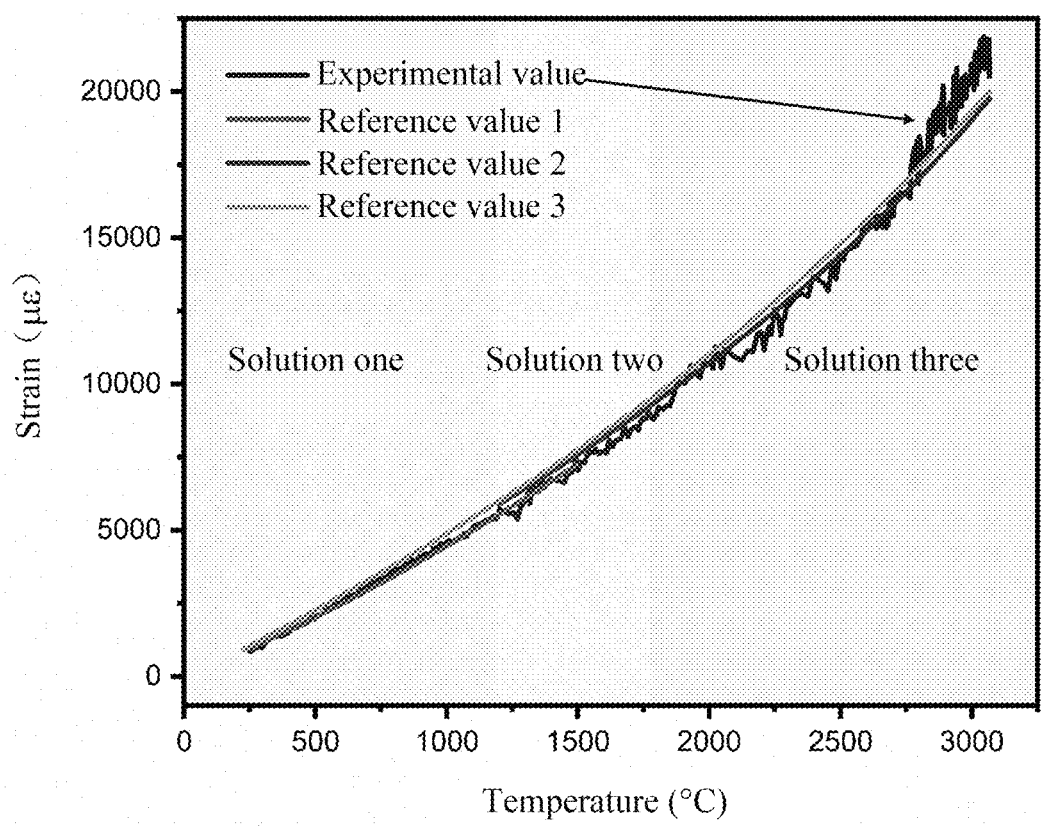
FIG. 4 is a strain curve of the tungsten block from the room temperature to 3067 degrees Celsius measured by the technical solution proposed by the present disclosure, and it is compared with the known document data; the result shows that the measurement error is smaller than 7%, indicating that the technical solution proposed by the present invention is feasible and correct.

As shown in FIG. 4, it is a strain curve of the tungsten block from room temperature to 3067 degrees Celsius measured by the technical solution proposed by the present disclosure, and it is compared with the published document data. The result shows that the measurement error is smaller than 7%, indicating that the technical solution proposed by the present disclosure is feasible and precise.

Though the above is described in detail embodiments of the present disclosure, those skilled in the art should understand that these are merely examples; without departing from the principles and the implementations of the present disclosure, various changes or modifications can be made on these implementing solutions; thus, the protection scope of the present disclosure is defined by the appended claims.

What is claimed is:

1. A method for measuring full-field strain of an ultra-high temperature (UHT) object based on a digital image correlation method, wherein: reducing interference on camera imaging by strong self-illumination of a high-temperature object by using UHT stability of a speckle material and a proper speckle making process, and meanwhile by way of superimposing double filters, finally realizing accurate measurement of full-field strain of the UHT object, comprising the following steps:

(1) polishing a to-be-measured surface of a test piece level by level to remove an oxide layer, and cleaning by alcohol to remove oily stains;

(2) mixing selected UHT-resistant speckle materials, tantalum carbide powder or chromium carbide powder or hafnium carbide powder, with absolute ethanol according to a mass ratio of 1:21:0.5 to form a paste; the UHT referring to being greater than 2000° C.;

(3) dipping the paste in step (2) by a needle tip to make randomly distributed speckle patterns on the surface of the test piece treated in step (1); or spraying the paste of tantalum carbide mixture on the surface of the test piece by using a spray gun to make randomly distributed speckle patterns;

(4) drying the speckles made in step (3) in room temperature for 6-8 h, to volatilize the ethanol;

(5) curing the test piece and the speckles dried in step (4) in two steps; first step: keeping them in a vacuum environment for 5 minutes at a temperature of 400 degrees Celsius, then cooling down to room temperature; second step: keeping them in a vacuum environment lower than $10^{-2}$ Pa magnitude for 5 minutes at a temperature of 800 degrees Celsius, then cooling down to room temperature;

(6) installing a sample of the test piece cured in step (5) to a test platform;

(7) adjusting the camera to make the test piece be imaged clearly in the camera, calibrating the digital image measuring system by a calibration board, connecting an infrared thermometer with a digital image correlation measurement system by a synchronous trigger software, to ensure that collected temperature data correspond to calculated strain field data one by one;

(8) heating the test piece in step (6) by using an electronic beam scanning heating system to a temperature range of 2000-3500 degrees Celsius;

(9) measuring a temperature of a predetermined region of the to-be-measured surface of the test piece by the infrared thermometer;

(10) consecutively shooting and recording planes with speckle patterns of the test piece in step (9) by using a CCD camera; at a first temperature range of 25-1200 degrees Celsius, realizing the strain measurement by using blue light illumination and a single blue light filter; at a second temperature range of 1200-1800 degrees Celsius, turning off the blue light illumination at the first temperature region, using the high temperature self-illumination of the object to be measured to perform CCD camera illumination to realize strain measurement; at a third temperature range of 1800-3500 degrees Celsius, in order to reduce the interference on the strain measurement due to the strong self-illumination of the high-temperature object, superimposing two blue filters to realize strain measurement;

(11) performing processes based on the digital image correlation method, and calculating the strain field data of the predetermined region in step (9).

2. The method for measuring full-field strain of an ultra-high temperature (UHT) object based on a digital image correlation method according to claim 1, wherein: the to-be-measured surface processed in step (1) is a surface of various metals, or a surface of ceramic materials; the polishing and cleaning processes remove oxide films and stains on the surface of the test piece.

3. The method for measuring full-field strain of an ultra-high temperature (UHT) object based on a digital image correlation method according to claim 1, wherein the speckle material in step (2) has a melting point greater than 3500° C. and UHT stability, and keeps chemical stability with the sample materials to be measured in the UHT condition; the speckle materials and the absolute ethanol are evenly mixed according to a mass ratio of 1:21:0.5, thus ensuring the quality of the speckles.

4. The method for measuring full-field strain of an ultra-high temperature (UHT) object based on a digital image correlation method according to claim 1, wherein the high-temperature speckles made in step (3) should have characteristics of random distribution and a proper size, corresponding to the size of the surface to be measured; the proper size refers to that the size should be 5-10 times of the camera resolution, and the CCD camera resolution refers to that each pixel corresponds to a size of the surface to be measured.

5. The method for measuring full-field strain of an ultra-high temperature (UHT) object based on a digital image correlation method according to claim 1, wherein in step (5), the vacuum degree during the curing should be lower than $10^{-2}$ Pa magnitude.

6. The method for measuring full-field strain of an ultra-high temperature (UHT) object based on a digital image correlation method according to claim 1, wherein in step (10), in order to improve the temperature range of the test measurement, two light filtering methods for reducing self-illumination of a high-temperature object are used: (1) turning off the externally added blue light source at the second temperature region of 1200-1800 degrees Celsius, illuminating by the high temperature self-illumination of the test piece; (2) at a higher temperature range, i.e., the third temperature range of 1800-3500 degrees Celsius, still illuminating by the high temperature self-illumination of the test piece, and additionally combining the filters of the two blue light wavebands; reducing the interference on the CCD camera imaging by the high temperature self-illumination by way of filtering twice.

7. The method for measuring full-field strain of an ultra-high temperature (UHT) object based on a digital image correlation method according to claim 1, wherein in step (10), using a CCD camera to implement two-dimensional strain filed measurement, and meanwhile using two CCD cameras to implement three-dimensional strain filed measurement.

8. The method for measuring full-field strain of an ultra-high temperature (UHT) object based on a digital image correlation method according to claim 1, wherein in step (10), the two blue light filters are: Bi 440, 420-455 nm; Bi 420, 406-435 nm, respectively, and a narrow-band filtering effect can be obtained through superimposing; reducing the interference on camera imaging by self-illumination of the high temperature object by filtering twice; or selecting a light filter of other wavebands to get the narrow-band filtering effect.

9. The method for measuring full-field strain of an ultra-high temperature (UHT) object based on a digital image correlation method according to claim 1, wherein in step (11), the strain field calculation method uses an image before heating as a reference image, and matches the heated speckle patterns of the test piece by using a digital image correlation method, so as to calculate a two-dimensional or three-dimensional strain filed.

10. The method for measuring full-field strain of an ultra-high temperature (UHT) object based on a digital image correlation method according to claim 1, wherein the speckle material is micron tantalum carbide powder, with an average granularity of 1 micron and a purity of 99.9%; or the speckle material can be micron chromium carbide powder, or micron hafnium carbide powder.

11. The method for measuring full-field strain of an ultra-high temperature (UHT) object based on a digital image correlation method according to claim 1, wherein performing non-contact measurement on the full-field deformation caused by thermal load and mechanical load when applying fusion reactor materials and structures into UHT ceramic composite materials and UHT alloys in extreme environments.

\* \* \* \* \*